United States Patent [19]

Schott, Jr.

[11] 3,762,313
[45] Oct. 2, 1973

[54] EXTRUDING PLASTIC

[75] Inventor: Charles M. Schott, Jr., Gloucester, Mass.

[73] Assignee: Gloucester Engineering Co., Inc., Gloucester, Mass.

[22] Filed: June 28, 1971

[21] Appl. No.: 157,695

Related U.S. Application Data

[62] Division of Ser. No. 806,861, March 13, 1969, Pat. No. 3,645,659.

[52] U.S. Cl. ................. 100/92, 100/93 S, 425/378
[51] Int. Cl. .......................... B29f 3/02, B02c 11/08
[58] Field of Search .................... 100/145, 146, 147, 100/148, 149, 150, 92, 93, 117; 425/378, 204

[56] References Cited
UNITED STATES PATENTS

| | | | |
|---|---|---|---|
| 1,750,916 | 3/1930 | Anderson et al. ................. | 100/93 S |
| 1,762,368 | 6/1930 | Vandergrift .................... | 100/93 S X |
| 2,149,736 | 3/1939 | Hiller et al. ..................... | 100/93 S X |
| 3,278,986 | 10/1966 | Welt ................................... | 425/378 |
| 3,354,504 | 11/1967 | Lehner ......................... | 425/378 UX |
| 3,416,189 | 12/1968 | Welt .............................. | 425/378 UX |

Primary Examiner—Peter Feldman
Attorney—John Noel Williams

[57] ABSTRACT

An extruder is shown having vertical arrangement of the extruder; a drive shank at the outlet end isolated by an internal air chamber from the heated extruder; the shank cooled by an inserted cooling member; a sealing member surrounding the shank defining a restricted passage that tapers and accommodates eccentricity; the stationary walls of the surrounding member are grooved, resisting outward leakage of the plastic. These various features are shown to achieve a compact, simple, efficient machine.

7 Claims, 3 Drawing Figures

EXTRUDING PLASTIC

This is a division of application Ser. No. 806,861, filed Mar. 13, 1969, now U.S. Pat. No. 3,645,659.

This invention relates to the extrusion of difficult materials generally.

It is an object of the invention to provide improved extruders of the type driven at the output end.

The invention also presents features which permit an exceedingly compact extruder to be achieved. Another feature, employing drive of the screw from the output end, is the definition of an air chamber in the screw itself, outward of the outlet passage. This chamber achieves thermal isolation of the outlet part of the screw which must be kept hot, and the drive shank of the screw, which is advantageously kept cool for proper operation of the reduction gears. With this air chamber there is advantageously combined a liquid cooling device for the outer end of the screw shank. This cooling contributes to the formation of an effective seal against escape of the molten plastic, without detrimental effect upon the high temperature level of the output passage.

With the foregoing features combined it has become possible to achieve a vertical extruder of large bore, e.g., with greater than 4 inch diameter screw, in a practical height, for instance a screw height of no greater than 12 or 14 diameters.

The invention also features an outer seal member forming the restricted sealing passage about the shank, the outer member having helical threads in its stationary inner surface, the direction of the threads being upward in the direction of rotation of the screw. This structure permits the seal assembly to be inexpensive relative to prior proposals of threads in the screw shank in the seal region, while successfully resisting the tendency of molten plastic to escape outwardly along the shank.

Still another feature with the bearing-mounted shank of the extruder screw at the outlet end, is a restricted sealing passage which tapers, widening in the direction away from the end of the screw, which is found to accommodate eccentricity of the screw during its operation under load, without detrimental wear or harm to the integrity of the seal. This feature also contributes to the practical success of large diameter extruders driven from the output end.

Other objects, features, and advantages will appear from the following description of a preferred embodiment of the invention, taken together with the attached drawings thereof, in which:

FIG. 3 is a view of the sealing arrangement near the shank.

Figure 1:
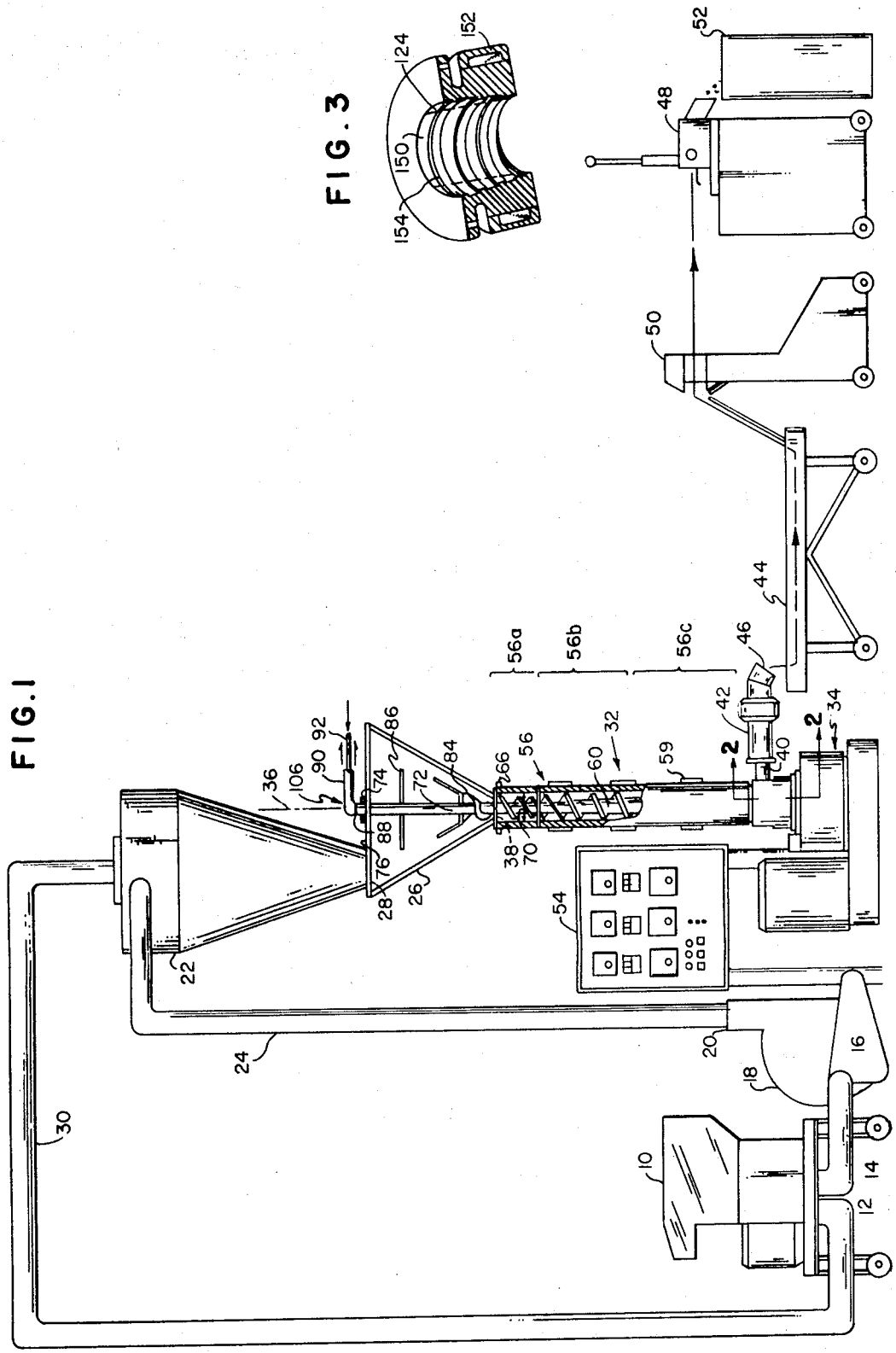
FIG. 1 is an overall view, partially broken away, of apparatus for reclaiming scrap.
Figure 2:
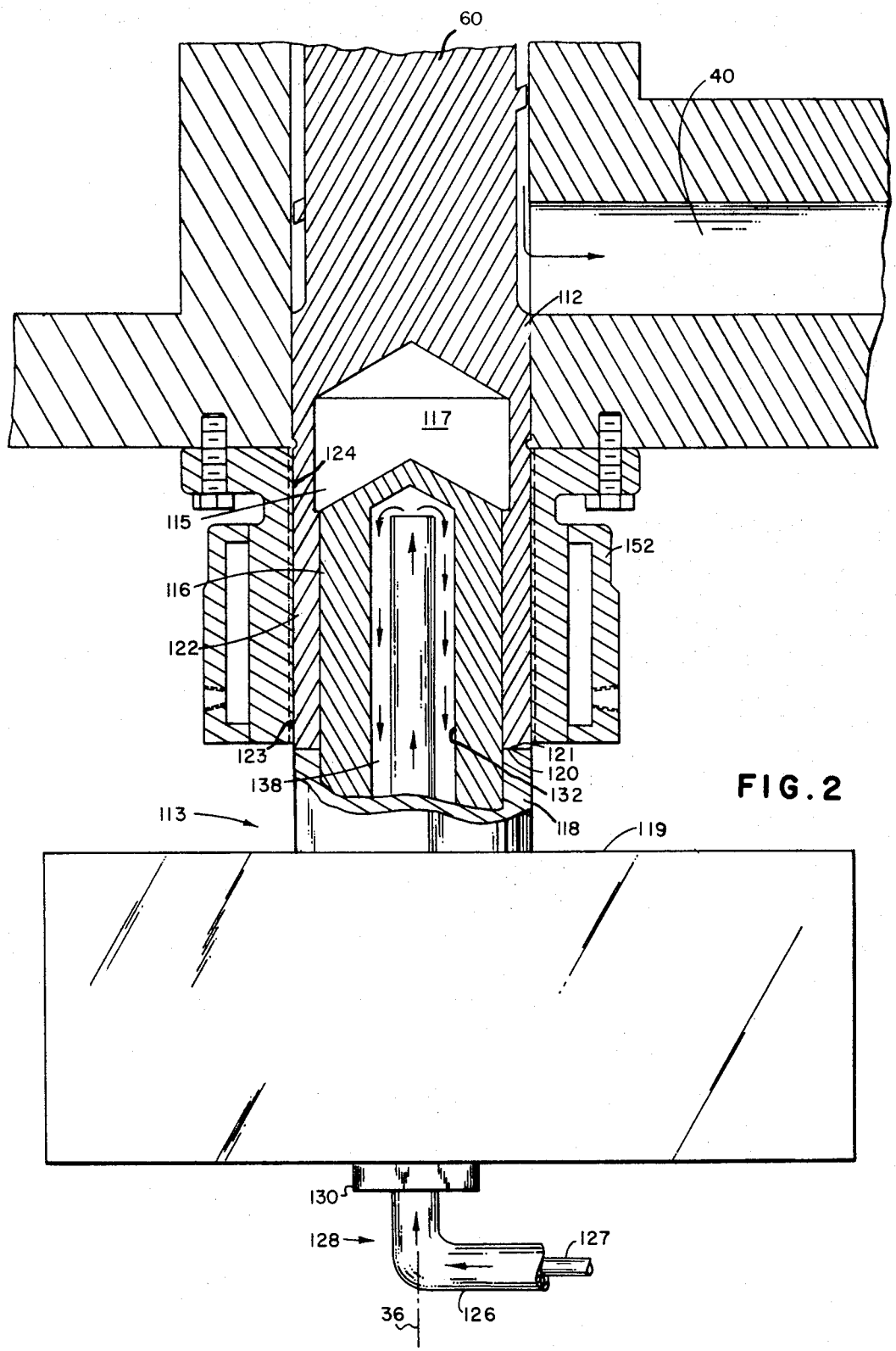
FIG. 2 is a cross-sectional view, taken along line 2—2 of FIG. 1, partially broken away, showing the cooling and thermal isolation chamber within the shank near the drive end and output passage of the extruder.

Referring to FIG. 1, grinder 10 is arranged to receive large sheets of plastic films and to cut them into flakes, called "fluff." These flakes may range in size for instance from a diameter one-fourth inch to three-fourths inch and have the thickness of the original film or sheet, e.g., 0.0005 inch to 0.010 inch. Such flakes may be produced with conventional grinders using screens with hole sizes ranging from one-half inch to 1 ½ inch diameter. The output 12 of grinder 10 is connected by pipe 14 to the input 16 of blower 18, the output 20 of which is connected to cyclone 22 by pipe 24.

Blower 18 receives fluff from grinder 10 and blows the fluff up pipe 24. Cyclone 22 which receives the fluff is mounted upon conical hopper 26 and has an opening 28 forming an inlet into hopper 26. It also has air return pipe 30 arranged to return air to grinder 12 and blower 18.

Vertical extruder 32 is mounted (on base 34) directly below hopper 26 with longitudinal axis 36 concentric with hopper 26, has inlet 38 from hopper 26 and output 40 to die 42, and due to this arrangement and the features to be described, it receives fluff from hopper 26, forces the fluff downwardly under pressure and melts it, and issues molten plastic through output 40 to die 42. Trough 44 is arranged to receive molten plastic strands from orifice 46 in die 42 and to cool the plastic strands with water. Pelletizer 48 pulls the cooled plastic from trough 44, through drier 50, to grind the plastic into pellets, and to deposit the pellets in container 52. Control panel 54 controls heating and cooling temperatures. The pellets from this process may now be treated as fresh stock useful with other extruders. Equally, the output of the extruder may be employed directly in forming articles, sheet or film.

Extruder 32 has barrel 56 which in addition to the feeder barrel portion 56a to be described, also has conventional transition barrel portion 56b, and metering barrel portion 56c. The inner surface of feeder barrel portion 56a has a number of grooves (not shown) cut immediately adjacent to each other and extending parallel to axis 36 over the entire length of portion 56a. The inner surfaces of portions 56b and 56c are smooth.

A plurality of surrounding heater bands 59 are spaced along the plasticizing portions of the extruder, sections 56b and 57c, to maintain the usual high temperature necessary for melting the plastic, e.g., 350° to 375°F.

The screw 60 with a machined helical flight 66 is rotatably mounted concentric with axis 36 on bearings (not shown) in base 34. An upper portion of the screw, 60a, having a hollow root defining chamber 62, extends through the feeder section 56a and extends upwardly through inlet 38 into hopper 26. The effective outer diameter of the screw 60 is slightly smaller than the inner diameter 70 of barrel 57a.

Hollow pipe 72 forms an upper extension of the screw and is rotatably mounted by bearing 74 on top 76 of hopper 26. It has inner diameter slightly larger than the outer diameter of the upper end of screw 60 over which it fits. It carries helical agitator 84 and upper agitator bar 86, and is arranged to be rotated by screw 60. Pipe 72 and internal pipe extend upwardly to rotary seal 88 with stationary pipes 90 and 92 which are connected to a water storage and cooling tank (not shown).

From the feeder section 56a downward to outlet 40 is the working length of the screw (transition section 56b and metering section 56c). In this embodiment the heater bands 59 spaced along this length are adapted to maintain temperatures of 350° F and above, for instance for extrusion of polyethylene.

At the lower end of this extruder the shank 112 of screw 60 extends beyond the plastic outlet 40 to the drive means 113. It has hollow air-containing insulating chamber 117 which is in turn above and adjacent cylindrical hollow portion 115, the latter filled by a cooling member 116 which defines the lower end of the insulating chamber 117. The air-filled chamber 117 is slightly separated from output 40 by a solid portion of screw 60.

Hollow cylindrical shaft 118, a lower extension of member 116, is mounted in the gear box 119 by bearings (not shown), and has annular surface 120 arranged to mate with base 121 of screw 60. Portion 122 is shrunk-fit around portion 116 and arranged to transmit torque applied (to shaft 118) to screw 60 and provides annular leakage path 123 for plastic which leaks between screw 60 and surface 124.

Outer pipe 126 and inner supply pipe 127 extend from a water pump (not shown) to 90° bend 128 and into rotary seal 130, making flow connection with annular space 138 between pipe 127 and surface 132 to provide a return path to the water storage and cooling tank for water pumped through pipe 127 in accordance with the arrows shown.

Referring to FIG. 3 the bore 150 of sealing ring 152 tapers, decreasing in diameter outwardly, to define a restricted sealing passage while permitting eccentricity of upper portions of the screw. Screw threads 154 formed in the bore surface are found to have a sealing effect, tending to apply an upward force on plastic which turns with the screw shank. These threads may be one-fourth inch pitch rectangular threads, one-eighth inch lands and grooves, with clearance varying from 0.001 to 0.005 inch over a 4 inch length from bottom to top of the seal. The depth of the grooves may be one thirty-second inch.

In operation the controls on panel 54 are set to the desired temperatures, grinder 10, blower 18, extruder 32, drier 50, pelletizer 48, and the water pump are turned on. Material to be extruded (for example, scrap plastic film to be reclaimed) is placed in grinder 10 where it is ground into fluff. The fluff descends from grinder output 12 into blower 18 through pipe 14 and input 16 and is blown through pipe 24 into cyclone 22. Air is recirculated from cyclone 22 through pipe 30 into grinder 10 and blower 18. The fluff is whirled about in cyclone 22 and descends under the force of gravity through opening 28 into hopper 26, whereupon it is agitated by agitators 84 and 86 as it descends within hopper 26.

As the fluff is forced into barrel 56, it passes from feeder barrel portion 56a into transition barrel portion 56b where it is heated. The fluff melts as it is gradually forced down into portion 56b and it passes through metering barrel portion 56c and output 40 into die 42 whereupon it issues, for example, in the form of strands or a sheet from opening 46 into cooling trough 44. It is drawn by pelletizer 48 through drier 50, enters pelletizer 48, is formed into pellets, and the pellets are deposited in container 52. The pellets thus produced or reclaimed are amenable to extrusion by ordinary processes (e.g., with a standard horizontal extruder).

The water pumped through pipe 127 into cooling member 116 quenches leakage of material through the rotary seal. Air filled chamber 117 insulates portion 122 from the heat in barrel portion 56c and prevents portion 56c from cooling to the extent that the molten plastic will begin to harden before it enters die 42.

While various of these features are useful in horizontally arranged extruders, the most advantageous arrangement, and one which permits operation on fluff over a wide range of physical characteristics is the preferred vertical extruder just described.

Other embodiments will occur to those who are skilled in the art and are within the following claims.

What is claimed is:

1. In an extruder assembly comprising a screw disposed within a barrel having a discharge end and having means driving said screw from said discharge end, said screw having a torque bearing shank protruding from said barrel discharge end, said shank being hollow and defining an insulating isolation chamber in the region close to the outlet of said extruder, and means to cool the end portion of said shank remote from said barrel discharge end.

2. The extruder assembly of claim 1 wherein said means to cool includes liquid conduit means for cooling the interior of said shank.

3. The assembly of claim 2 wherein said shank is hollow to its end and said means to cool comprises a cooling member inserted into said hollow end.

4. The assembly of claim 3 wherein said isolation chamber is an air-containing chamber and the inner end of said cooling member defines the outer end of said air-containing insulating chamber.

5. A heated extruder including a screw having a torque bearing shank extending beyond the extruder outlet, for driving said screw, a seal defined with said shank for the molten plastic within said extruder, said seal comprising a liquid cooling member inserted into the hollow end of said shank, cooling its outer surface, and a cooled outer sealing member surrounding said shank and defining therewith a restricted leakage passage.

6. The extruder of claim 5 wherein said cooling member comprises an outer tubular member tightly fitting against the inner surface of said hollow shank, the inner end of said tubular member being closed, and a conduit smaller than the internal diameter of said tubular member inserted into said tubular member, liquid inlet and outlet passages defined thereby.

7. The extruder of claim 6 wherein the hollow chamber within said shank extends beyond the end of said cooling member, defining therewith an isolating air chamber.

* * * * *

Disclaimer 3,762,313.—*Charles M. Schott, Jr.*, Gloucester, Mass. EXTRUDING PLASTIC. Patent dated Oct. 2, 1973. Disclaimer filed May 29, 1973, by the assignee, *Gloucester Engineering Co. Inc.*

Hereby disclaims the portion of the term of the patent subsequent to Feb. 29, 1979.

[*Official Gazette January 8, 1974.*]